United States Patent [19]

Alphonso

[11] Patent Number: 4,457,071
[45] Date of Patent: Jul. 3, 1984

[54] APPARATUS FOR MEASURING COIL TUBING

[76] Inventor: Louis J. Alphonso, P.O. Box 1239, Chalmette, La. 70044

[21] Appl. No.: 300,958

[22] Filed: Sep. 10, 1981

[51] Int. Cl.³ .............................................. G01B 3/12
[52] U.S. Cl. .................................................. 33/134 R
[58] Field of Search ................. 33/134, 129, 132, 133

[56] References Cited

U.S. PATENT DOCUMENTS 1,006,473 10/1911 Frank ................................. 33/134 R
1,969,969 8/1934 Dunagin .......................... 33/134 R

*Primary Examiner*—Harry N. Haroian
*Attorney, Agent, or Firm*—Bode & Smith

[57] ABSTRACT

An apparatus for measuring the longitudinal distance of cable or tubing having a primary support frame, at least one guide wheel rotatably mounted between the arms of the primary support frame, a secondary support frame mounted between the arms of the primary support frame, the secondary support frame supporting at least one idler wheel for engaging the tubing to be measured between the idler wheel and side drive wheel; means for selectively imparting tension on secondary support frame for further imparting tension on the tubing to be measured between the idler wheel and the guide wheel and means for numerically registering the length of tubing travelled along the measuring wheel. The apparatus also has a support bracket means for supporting the apparatus during the use of the apparatus.

6 Claims, 5 Drawing Figures

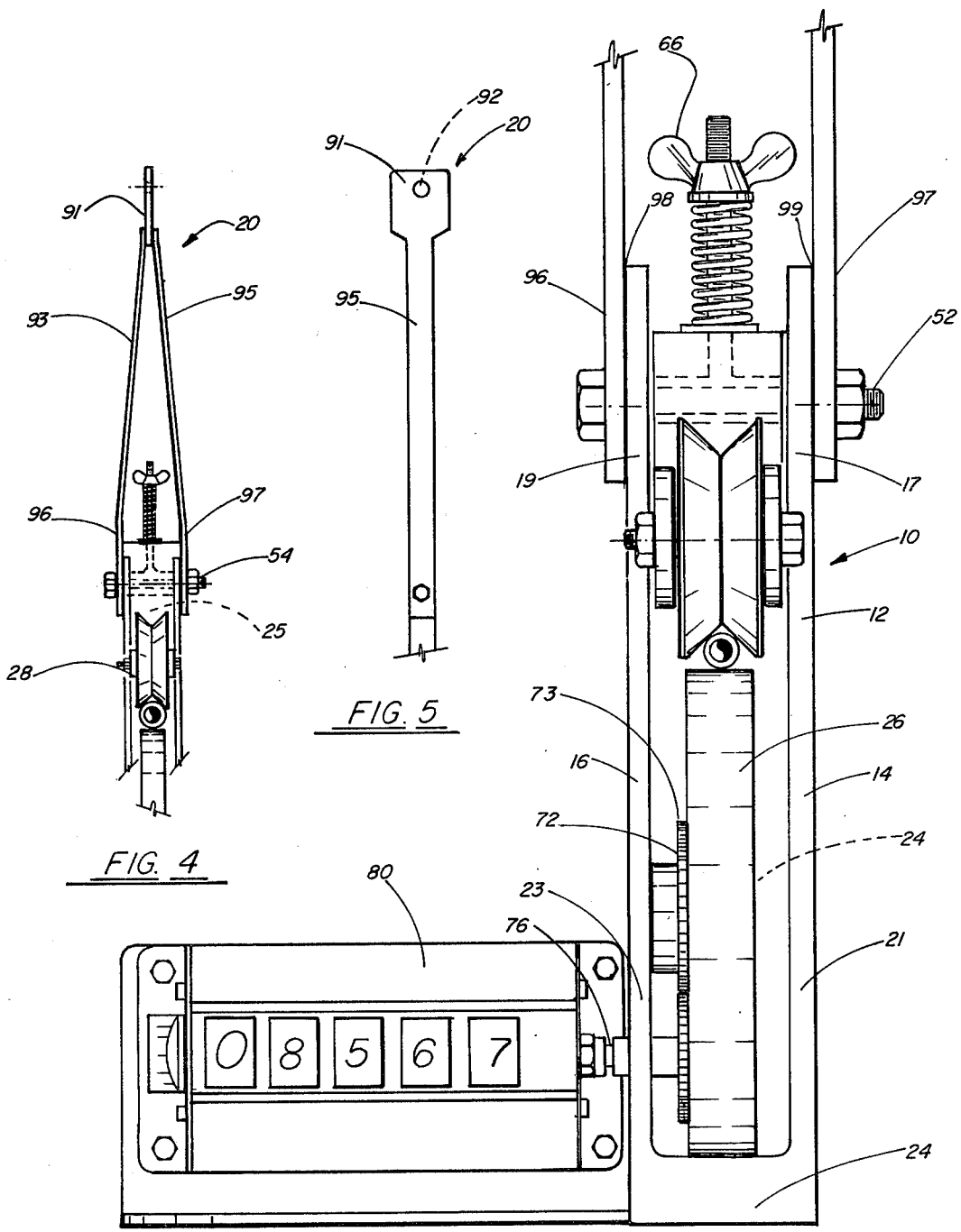

APPARATUS FOR MEASURING COIL TUBING

BACKGROUND OF THE INVENTION

1. Field of the Invention

The apparatus of the present invention relates to measuring devices. More particularly, the apparatus of the present invention would relate to a coil tubing length measuring apparatus for measuring the length of coil tubing being inserted down a well hole.

2. Background of the Invention

In the drilling operations and production of oil and gas wells, it is very common that a particular apparatus or device must be inserted down the well hole in order to perform certain jobs and the completion of the oil well. Very frequently, what is required, is that the oil well be purged and any mud and/or debris, prior to the bringing up of oil or gas, which is being drilled for. During this purging process, for example, flexible metal tubing is inserted down into the well hole to a very precise depth at which time highly pressurized liquid or fluid nitrogen is inserted into the tubing down into the well hole in order to purge out the well and to possibly drive back the oil or gas in the cavity of the well hole in order to seal off the hole in order to bring up more purified oil and gas. Also, this tubing may enable the production crew to insert various types of lubricants, etc., which would assist in the production of oil and gas.

What is crucial about this process, is that the tubing be inserted to this precise depth, so that the production crew is knowledgable that when the fluids which are being inserted down through tubing reach the end of the tubing, that these fluids have ben carried down to a precise depth within the hole.

Several apparatuses have been patented which may speak to a device which could be utilized for this purpose. However, of the patents in this particular art, those which have been patented are rather limited in their use, and have shortcomings which will be discussed further.

U.S. Pat. No. 3,411,350 entitled "Cable Length and Tension Indicating Apparatus" issued to M. T. Sokolosky, discloses a cable length and tension measuring apparatus comprising a rigid supporting frame, a measuring wheel mounted on the frame, an indicator means for the tension and length measuring means. In this particular apparatus, the pair of the guide wheels are tensionly mounted, in order to guide the cable along the drive wheel.

U.S. Pat. No. 2,154,621 entitled "Measuring Instrument" issued to C. R. Jenkins would provide for a measuring wheel in which the cable or rope to be measured is held to the wheel by rollers rigidly affixed to an arm. In this particular apparatus, one of the rollers is adjustable along a certain area for imparting additional tension on the cable.

U.S. Pat. No. 3,068,479 entitled "Line Measuring and Movement Indicating Device" issued to J. L. Newman provides for a measuring wheel and means for preventing lateral movement of a cable or line as the line moves longitudinally in contact with the measuring wheel from one end of the guide to the other.

U.S. Pat. No. 2,940,173 entitled "Trawl Cable Meter" issued to C. A. Crecelius provides for a cable meter which comprises a housing to which a cable can be drawn to which is rigidly attached rollers mounted in tandum for rolling the cable on and a wheel for holding the cable against the rolling means. This particular apparatus would be used during trawling operations in fishing.

U.S. Pat. No. 2,060,233 entitled "Measure Meter" issued to C. A. Mathey et al provides for a meter for measuring the length of cable that passes therethrough. There is provided a plurality of wheel counters which are supported by a rigid frame.

U.S. Pat. No. 1,481,980 entitled "Cable Measuring Device" issued to R. R. Bostic provides for a wheel counter supported by a rigid frame to which is also rigidly attached a second wheel or idler for regulating the path of cable to be measured.

U.S. Pat. No. 2,327,506 and 2,136,457 also disclose measuring devices which comprise wheels, pulleys and cables in this particular field of the art.

In general, the above cited patents failed to fulfill the needs as required in this particular field of endeavor. That is, the measuring apparatus must very accurately measure the amount of cable or tubing being pulled through the apparatus, and must provide for an adjustable amount of tension between the driver wheel and idle wheels.

3. General Discussion of the Present Invention

The present invention would solve the problems and the present state of the art shortcomings thereof in a simple and inexpensive, straightforward manner. The present invention would provide for an apparatus for measuring the longitudinal distance of cable or tubing, having a unitary support frame with a first end having a pair of broad support arms for rotatably mounting a measuring wheel therebetween, with the support arms generally comprising a unitary base support structure. There is a second end having a pair of mounting arms, in substantially parallel relationship and integrally connected to the spport structure. Also is provided a secondary support frame substantially transversely mounted between the pair of mounting arms, and adjustable in an upward and downward path, a pair of grooved guide wheels rotatably mounted on each end of the transverse secondary frame, and a means for engaging the tube to be measured between the pair of grooved wheels and the measuring wheel, with that means being an adjustable means for imparting a predictable amount of tension between the idle wheels and the measuring wheel. Engaged onto the measuring wheel is a counter means for numerically registering the length of tubing travelling along the measuring wheel, with a read-out being directly the result of the number of feet or meters travelled by the coil tubing along the measuring wheel.

Thus, it is an object of the present invention to provide a simple and inexpensive apparatus for measuring the longitudinal distance of cable or tubing being inserted down into a well hole.

It is another object of the present invention to provide an apparatus which is generally comprised of a unitary support frame housing with a measuring wheel with idle wheels mounted thereupon.

It is a further object of the present invention to provide an apparatus wherein selective amounts of tension may be imparted between the idle wheels and guide wheel for measuring the length of tubing being passed therethrough.

It is a further object of the present invention to provide an apparatus wherein the idle wheels are able to maneuver up and down in order to adjust to the movement of the tubing as it is travelling through the apparatus, always keeping the center line of tension constant.

It is still a further object of the present invention to provide an apparatus wherein the counter which reflects the length of tubing travelled may be mounted on either the right or left side of the apparatus, depending on the situation.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and, wherein:

FIG. 3 is a frontal exploded view of the apparatus of the present invention;

FIG. 4 is a frontal view of the apparatus of the present invention including the mounting frame; and FIG. 5 is a side view of the mounting support bracket of the preferred embodiment of the apparatus of the present invention.

DETAILED DESCRIPTION OF THE PREFERRED EMBODIMENT

Figure 1:
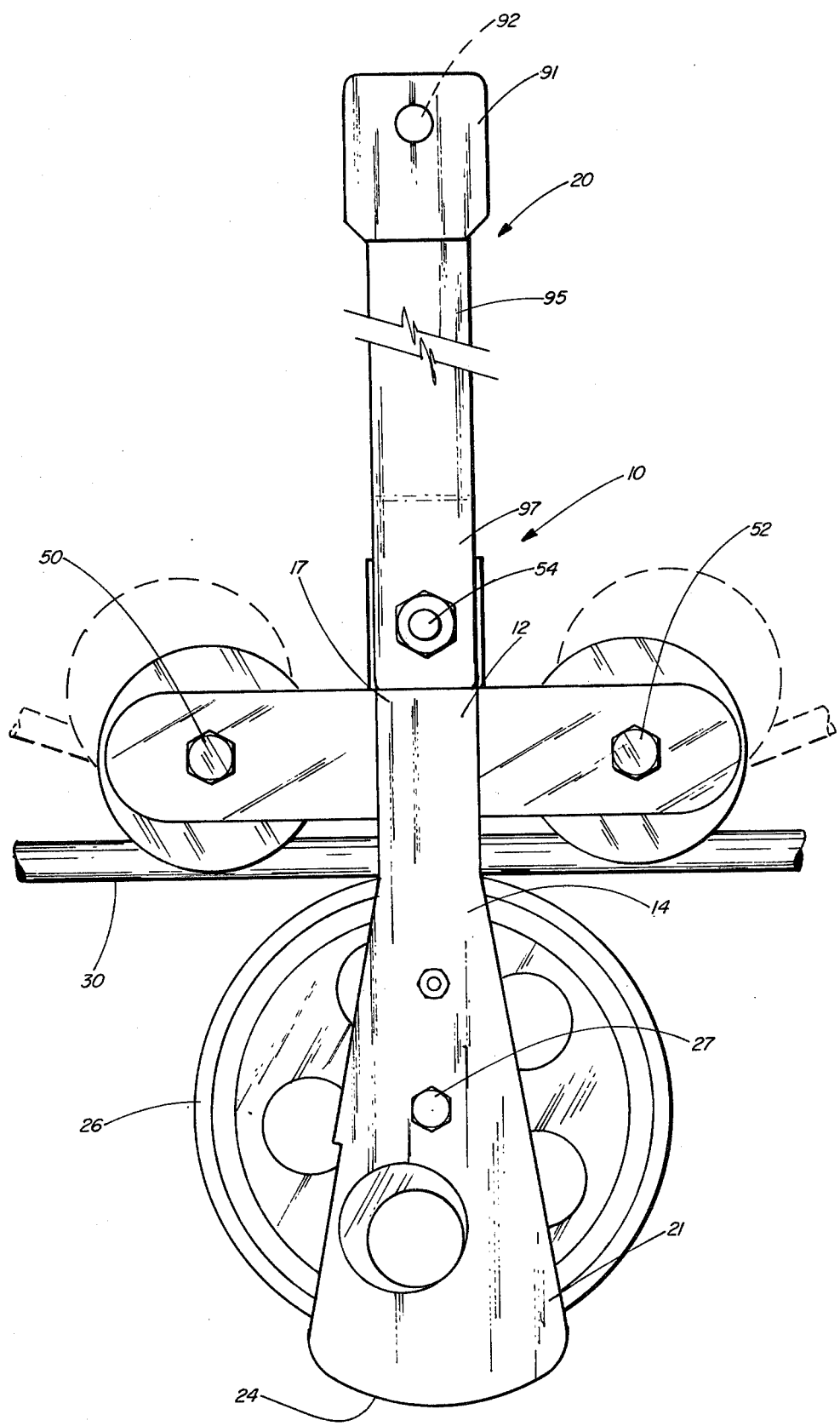
FIG. 1 is a side view of the preferred embodiment of the apparatus of the present invention.
Figure 2:
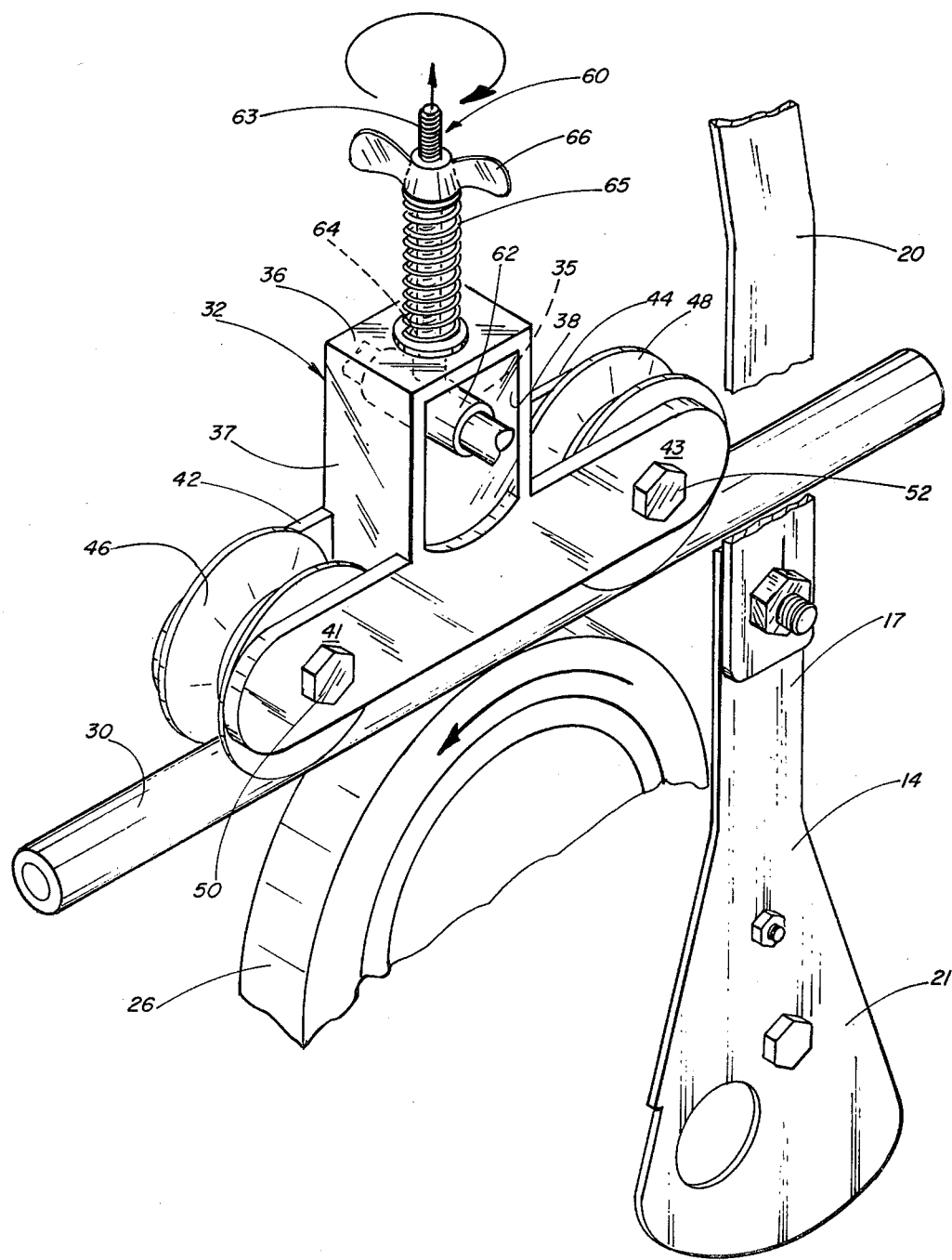
FIG. 2 is a partial cut-away perspective view of the preferred embodiment of the apparatus of the present invention.

FIGS. 1 through 3 best illustrate the preferred embodiment of the apparatus of the present invention generally designated by the numeral 10. As is illustrated in the figures, there can be seen apparatus 10 having unitary support frame 12 comprising a pair of generally parallel support arms 14 and 16 integrally connected at their lower most end by floor portion 24. The pair of support arms 14 and 16 generally define a U-shaped support frame 12, for housing the remaining portions of the apparatus as will be discussed further. Generally, support arms 14 and 16 have a upper neck portion 17 and 19, each of which is open ended and attachable to support bracket 20, as illustrated in FIGS. 4 & 5 in front and side view respectively and in partial view in FIG. 3. Support arms 14 and 16, being generally parallel, extend downward from the neck portions 17 & 19 to a flared lower portion 21 and 23, the lower most ends of flared portions 21 and 23 being integrally connected by welding or the like to floor portion 24 as discussed earlier. The space 25 therebetween defined by portions 21 and 23 rotatably house drive wheel 26, as seen in FIGS. 1 & 2, in partial side view, drive wheel 26 being centrally rotatable on bolt 27, which extends between the outer most portions of broad support sections 17 and 19 and is attached on its other end with a nut means 28 as seen in FIG. 4.

As is further illustrated in FIG. 2, floor portion 24, is generally convexly curvatured to accommodate the passage of the drive wheel 26 during the rotating of the wheel 26. Drive wheel 26 is generally a metalic wheel which has a flattened exterior track section, making contact with cable or tubing 30, as illustrated in FIGS. 1 and 2.

The upper most section of support frame 12 would house idler wheel support section 32, which, as is illustrated in the preferred embodiment in FIG. 2, is generally a central box support area 35 having a horizontally disposed top portion 36, and vertical wall portions 37 and 38. Extending outward vertically from each wall portion 37 and 38 are wheel support sections 41, 42, 43 and 44. Each idler wheel 46 and 48 is rotatably mounted between support arms 41, 42, and 43, 44 respectively. As with the drive wheel 26, idler wheels 46 and 48 are rotating on a central axis defined by bolts 50 and 52 extending throughout support arms 41, 42 and 43, 44 respectively of idler wheel support frame 32. As is further illustrated in side view of FIG. 2, and cut-away view in FIG. 3, idler wheel support section 32 is disposed through the upper ends of support frame 12, by a bolt 54, which extends through the exterior of one side of support frame 12, through box support area 35 in support section 32, and through T-shaped bracket support 60, the horizontal portion of which defines an elongated collar section 62 for passage of bolt 54 therethrough, and the vertical bolt extension 63 integrally connected to and extending off the top portion of collar section 62 and extending through opening 64 in top portion 36 of idler wheel support section 32. Bolt 63 would engage thereupon spring 65, which would be tensionally engaged between the upper face 36 of box section 32 and wing nut 66.

In the preferred embodiment, as illustrated in partial perspective side view in FIG. 3, idler wheels 46 and 48 have V-shaped grooves to accommodate the passage of tubing 30 between idler wheels 46 and 48 and drive wheel 26. It is essential that the tension be maintained between idler wheels 46 and 48 and drive wheel 26, so that the passage of tubing 30 therebetween, frictionally engages drive wheel 26 to a point whereby drive wheel 26 is rotated. This is accomplished by selectively imparting tension between idler wheels 46 and 48 and drive wheel 26 by means of tightening or loosening of wing nut 66. In the preferred embodiment, as wing nut 66 is tightened, spring 65 imparts tension between wing nut 66 and idler wheel frame 32, thus imparting downward pressure on idler wheels 46 and 48 onto tubing 30. Since T-support bracket 60 is mounted at the upper portion of frame 32, the bracket serves as an immovable mount and thus frame 32 must react to the pressure imparted by spring 60, thus exerting pressure onto tubing 30 by idler wheels 46 and 48 onto drive wheel 26.

As can be seen in FIG. 3, drive wheel 26 is connectedly attached along its inner wall to gear 72 which rotates at the same speed as drive wheel 26. Teeth 73 of gear wheel 72 mesh with second gear wheel 74 which is attached via a shaft 76 to counter unit 80. As drive wheel 26 is rotated by the passage of tubing 30 between drive wheel 26 and idler wheels 46 and 48, the rotation of the drive wheel 26 imparts rotation to gear 72, which imparts rotation to gear 74 and thus engages counter means 80 to determine the distance of tubing 30 travelled through apparatus 10. Of course, in the preferred embodiment, counter 80 would be calibrated so that the numbers appearing on the counter would indicate the number of feet of tubing that have passed through the apparatus.

As is further illustrated in FIGS. 4 and 5, support bracket 20, as discussed earlier, would be a generally elongated V-shaped support having at its upper end an upper head portion 91 having a bore 92 therethrough for mounting onto a cable or the like and integrally attaching onto the upper end of the arms 93 and 95. The lower most ends of arms 93 and 95, as illustrated in FIGS. 4 and 5, would, in the preferred embodiment, be attached to apparatus 10 via bolt 52, that same bolt which mounts idler wheels support frame 32 onto apparatus 10.

In the preferred embodiment, arms 93 and 95, at their lower ends 96 and 97 respectively, would be slightly angulated to the vertical for proper alignment with the exterior walls 98 and 99 of frame 12 as illustrated in FIGS. 3 and 4. Thus, during use of apparatus 10, under certain conditions, apparatus 10 may be supported by bracket 22, onto a stable cable or the like through bore 92, and thus, this would eliminate the possibility that apparatus 10, should tubing 30 disengage therefrom, be damaged by falling onto the surface of the rig or other area.

FIG. 1 illustrates in lieu of fanthom the relative movement which idler support frame 32 undergoes during the movement of tubing 30 therethrough since the tubing 30 is generally of great length and has a great flexibility, the tubing 30 tends to waver up and down as it is moving between idler wheels 46 and 48 and drive wheel 26. Since idler wheel frame 32 is attached to apparatus 10 via bolt 54, which is a single engaging, support frame 32 has the ability, therefore to rock up and down along the bolt 54 axis, and therefore, this relative movement enables the flexible tubing 30 to have its free movement through apparatus 10 without the need for putting it under stress on the apparatus 10 due to the rocking ability of the idler wheel frame 32.

In the preferred embodiment, apparatus 10 would be constructed of cast aluminum or other light-weight yet sturdy materials. Both the idler wheels and the drive wheel would be mounted on bearings for greater efficiency and longer life. It is important to note that counter means 80 is a typical type of counter which is well known in the art, and no claim is made to invention of this particular portion of the apparatus.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for measuring the longitudinal length of cable or tubing, comprising:
   a. a primary support frame having a generally parallel pair of support arms;
   b. at least one drive wheel rotatably mounted between said arms of said primary support frame;
   c. a secondary support frame substantially transversely mounted on an immovable mount bolted between said parallel support arms of said primary support frame and adjustable in an up and down path on a vertical extension of said immovable mount, said secondary support frame supporting a pair of idler wheels for engaging the tubing to be measured between said pair of idler wheels and said drive wheel;
   d. tension means in engagement between said secondary support frame and retaining means on the upper portion of said immovable mount for selectively imparting tension on said secondary support frame for further imparting tension on the tubing to be measured between said idler wheels and said drive wheel; and
   e. means for numerically registering the length of tubing travelled along said drive wheel.

2. The apparatus in claim 1, further comprising support bracket means for supporting said apparatus during the use of said apparatus.

3. The apparatus in claim 1, where said primary support frame generally extends the complete vertical length of the apparatus.

4. The apparatus in claim 1, wherein said secondary support frame comprises:
   a. two pairs of mounting arms, each pair of mounting arms defining a bracket for mounting an idler wheel therebetween; said mounting arms being transversely directed from the vertical axis of said primary mounting frame;
   b. an upper support section, integrally connected to said mounting arms at its lower end and mounted to said primary frame on its upper end by slidable engagement with said immovable mount.

5. The apparatus in claim 1, wherein said means for imparting tension between said idler wheels and said drive wheel generally comprises a spring engaged between a retaining nut on said vertical extension of said immovable mount and the top portion of said secondary frame wherein the tension imparted upon said spring imparts further tension upon said idler wheels towards said drive wheel.

6. An apparatus for measuring the longitudinal length of cable or tubing, comprising:
   a. a unitary support frame having at a first end a pair of broad support arms for rotatably mounting a drive wheel therebetween, said support arms generally comprising a unitary base support structure with said arms integrally connected at said first end by a floor portion, and a second end with said pair of support arms in substantially parallel relationship, and open ended;
   b. a secondary support frame substantially transversely mounted between said pair of mounting arms, and adjustable in an upward and downward path;
   c. a pair of grooved guide wheels rotatably mounted on each end of said transverse secondary frame;
   d. means for engaging the tubing to be measured between said pair of guide wheels and said drive wheel, said means generally comprising:
      i. screw means having a threadably engaged wing nut on a vertical bolt extension, vertically and slidably engaging said transverse frame at the end of said screw means opposite said wing nut, said end opposite said wing nut being rigidly connected to said unitary support frame;
      ii. spring means mounted between said wing nut and the upper portion of said secondary frame along the shaft of said vertical bolt extension for imparting tension on said secondary frame which causes frictional engagement of the tube to be measured between said guide wheels and said drive wheel; and
   e. means for numerically registering the length of tubing travelled along said drive wheel, the readout on said registering means being the direct result of the distance travelled by said tubing in contact with said drive wheel.

* * * * *